(12) United States Patent
Pusheck

(10) Patent No.: US 11,156,292 B2
(45) Date of Patent: Oct. 26, 2021

(54) PRESSURE SENSOR UNIT WITH CIRCULAR GASKET

(71) Applicant: VEONEER US INC., Southfield, MI (US)

(72) Inventor: Jacob Pusheck, West Bloomfield, MI (US)

(73) Assignee: VEONEER US INC., Southfield, MI (US)

( * ) Notice: Subject to any disclaimer, the term of this patent is extended or adjusted under 35 U.S.C. 154(b) by 797 days.

(21) Appl. No.: 15/924,896

(22) Filed: Mar. 19, 2018

(65) Prior Publication Data

US 2019/0285178 A1    Sep. 19, 2019

(51) Int. Cl.
| | |
|---|---|
| *F16J 15/06* | (2006.01) |
| *F16J 15/08* | (2006.01) |
| *G01L 23/08* | (2006.01) |
| *B60C 23/04* | (2006.01) |
| *F02F 11/00* | (2006.01) |

(52) U.S. Cl.
CPC ......... *F16J 15/064* (2013.01); *B60C 23/0408* (2013.01); *B60C 23/0491* (2013.01); *F16J 15/0818* (2013.01); *G01L 23/08* (2013.01); *F02F 11/002* (2013.01); *F16J 2015/0868* (2013.01)

(58) Field of Classification Search
CPC ........ F16J 15/064; F16J 15/024; F16J 15/025; F16J 15/027; F16J 15/028; F16J 15/0818; G01L 23/08; F02F 11/002
USPC .................................. 277/591, 594; 74/606 R
See application file for complete search history.

(56) References Cited

U.S. PATENT DOCUMENTS

| | | | | | |
|---|---|---|---|---|---|
| 2,553,222 | A | * | 5/1951 | Wallgren | F16J 15/0881 123/193.3 |
| 4,192,520 | A | * | 3/1980 | Hasegawa | F02F 7/006 277/591 |
| 5,022,664 | A | * | 6/1991 | Kitada | F16J 15/0818 277/591 |
| 5,687,975 | A | * | 11/1997 | Inciong | F02F 7/006 277/591 |
| 6,168,166 | B1 | * | 1/2001 | Akimoto | F16J 15/0825 277/591 |

(Continued)

FOREIGN PATENT DOCUMENTS

| | | | | |
|---|---|---|---|---|
| DE | 102013208537 | 7/2014 | ............. | G01L 11/00 |
| EP | 2938986 | 7/2014 | ............. | G01L 19/06 |

(Continued)

*Primary Examiner* — Vishal A Patel
*Assistant Examiner* — L. Susmitha Koneru
(74) *Attorney, Agent, or Firm* — Christopher P. Maiorana, PC

(57) ABSTRACT

An apparatus includes a gasket and a housing assembly. The gasket may have (i) a compression region around an outer perimeter, (ii) a sloped region adjoining the compression region, (iii) a central region and (iv) a passage in communication with an exterior of the apparatus. The housing assembly may have a sealing edge and may be configured to hold a sensor. The sealing edge may compress the gasket in the compression region and in the sloped region. The sensor (a) may seal to the central region of the gasket and (b) may be in communication with the exterior of the apparatus through the passage.

20 Claims, 6 Drawing Sheets

(56) References Cited

U.S. PATENT DOCUMENTS

| | | | |
|---|---|---|---|
| 6,406,032 B1* | 6/2002 | Miyaoh | F16J 15/0818 |
| | | | 277/594 |
| 6,431,554 B1* | 8/2002 | Miyamoto | F16J 15/0825 |
| | | | 277/593 |
| 6,827,352 B2* | 12/2004 | Ueta | F16J 15/0825 |
| | | | 277/592 |
| 7,377,149 B2 | 5/2008 | Ruth et al. | 73/23.31 |
| 8,302,484 B2* | 11/2012 | Henzler | G01L 19/0038 |
| | | | 73/756 |
| 8,528,413 B2* | 9/2013 | Seitz | G01L 19/141 |
| | | | 73/753 |
| 8,616,067 B2* | 12/2013 | Wagner | G01L 19/146 |
| | | | 73/756 |
| 8,931,348 B2 | 1/2015 | Kunert | |
| 9,260,071 B2* | 2/2016 | Murray, Jr. | H05K 5/0073 |
| 9,310,229 B2 | 4/2016 | Herderich et al. | |
| 9,360,348 B2 | 6/2016 | Henzler et al. | |
| 9,714,851 B2 | 7/2017 | Bertsch et al. | |
| 9,812,792 B2 | 11/2017 | Herrmann et al. | |
| 2008/0134135 A1 | 12/2008 | Liao | 73/146.5 |
| 2009/0058015 A1* | 3/2009 | Laule | B60K 15/077 |
| | | | 277/591 |
| 2013/0192361 A1 | 8/2013 | Henderich et al. | |
| 2016/0204525 A1* | 7/2016 | Herrmann | H01R 4/28 |
| | | | 73/431 |
| 2017/0067459 A1* | 3/2017 | Bayyouk | F16K 25/00 |
| 2019/0293511 A1* | 9/2019 | Pusheck | F16L 37/084 |
| 2019/0293513 A1* | 9/2019 | Pusheck | G01L 19/0038 |
| 2019/0301959 A1* | 10/2019 | Pusheck | G01L 19/14 |

FOREIGN PATENT DOCUMENTS

| | | | |
|---|---|---|---|
| GB | 2457658 | 2/2008 | |
| JP | 2012027022 | 2/2012 | ............ G01L 19/14 |
| WO | WO2013/0153088 | 10/2013 | ............ B60C 23/04 |

* cited by examiner

PRESSURE SENSOR UNIT WITH CIRCULAR GASKET

FIELD OF THE INVENTION

The invention relates to vehicle sensors generally and, more particularly, to a method and/or apparatus for implementing a pressure sensor unit with a circular gasket.

BACKGROUND

Pressure sensors conventionally operate in moisture-rich environments and therefore are sealed inside a housing. To accomplish the sealing, a gasket is commonly used with the sensor to control the environment to which the sensor is exposed. However, leaks around the gasket cause problems for the sensor measurements.

It would be desirable to implement a pressure sensor unit with a circular gasket.

SUMMARY

The invention concerns an apparatus including a gasket and a housing assembly. The gasket may have (i) a compression region around an outer perimeter, (ii) a sloped region adjoining the compression region, (iii) a central region and (iv) a passage in communication with an exterior of the apparatus. The housing assembly may have a sealing edge and may be configured to hold a sensor. The sealing edge may compress the gasket in the compression region and in the sloped region. The sensor (a) may seal to the central region of the gasket and (b) may be in communication with the exterior of the apparatus through the passage.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a pressure sensor unit with a circular gasket that may (i) increase sealing performance compared with conventional seals, (ii) utilize a sloped region, (iii) include a notch in a sealing edge, (iv) include a ridge in the gasket, (v) be cost effective, (vi) allow for interchangeable mounting configurations, (vii) incorporate one or more integrated circuits and/or (viii) be implemented using one or more plastic assembly fabrication techniques.

Embodiments of the invention generally provide a snap-fit pressure sensor unit (or device) with an improved environment sealing performance. The pressure sensor unit may include a base assembly and a housing assembly. A gasket within the pressure sensor unit may provide both a circular outer sealing surface (or region) and a rectangular inner sensor sealing surface (or region). A passage (or vent) in a center of the gasket generally allows a pressure signal to be transmitted to the pressure sensor from outside the pressure sensor unit.

The outer sealing surface may provide an initial barrier between an exterior environment and a pressure sensor inside the pressure sensor unit. The outer sealing surface generally provides an annular compression surface (or region) to engage a sealing portion of the housing assembly. The outer sealing surface may include an angled surface (or region) against which the sealing surface also mates. The angled outer surface generally provides an increased surface-to-surface area to prevent contamination (e.g., water) intrusion. The angled surface may result in smaller high-pressure contact areas where the sealing portion engages the gasket. The angled surface may also increase a sealing force as a pressure differential rises, thereby making the seal more reliable.

The sensor sealing surface of the gasket may provide an additional barrier between the exterior environment and an active side of the pressure sensor. The sensor sealing surface may be raised relative to the surrounding outer sealing surface of the gasket. The raised sensor sealing surface generally provides extra compression on the sensor to provide electrical connection as well as deformation that wraps around the sensor thereby creating an additional seal.

Figure 1:
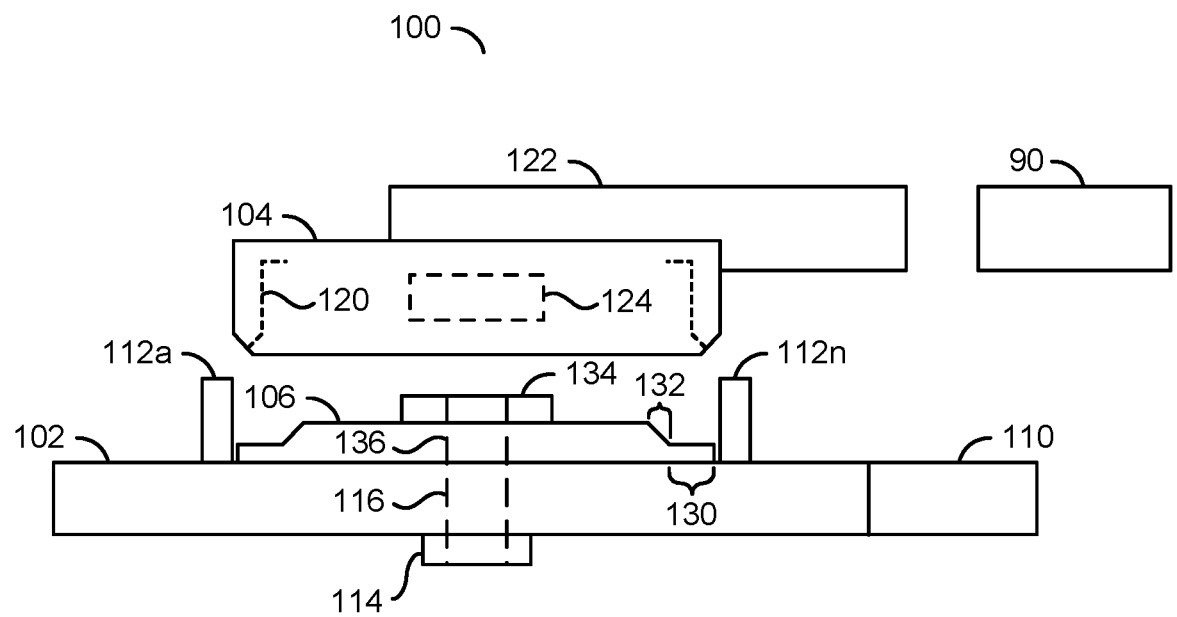
FIG. 1 is a diagram illustrating a sensor unit in accordance with an embodiment of the invention.

Referring to FIG. 1, a diagram illustrating an example implementation of a sensor unit 100 is shown in accordance with an embodiment of the invention. The sensor unit (or apparatus, or system, or device) 100 generally implements a gas pressure sensor suitable for use in automotive applications. The sensor unit 100 generally comprises a base assembly 102, a housing assembly 104, and a gasket 106.

The base assembly 102 may include a mounting feature 110, multiple tabs 112a-112n and an optional coupler 114. A passage 116 may be formed through the base assembly 102 and the coupler 114. The base assembly 102 may be formed of a hard plastic material and has a generally circular shape. The materials used to fabricate the base assembly 102 may include, but are not limited to, polybutylene terephthalate (PBT) and nylon, and usually are glass filled. The base assembly 102 may be fabricated by injection molding.

The mounting feature 110 may be implemented as a mounting boss. The mounting feature 110 may secure the pressure sensor unit 100 to a structure of a motor vehicle (e.g., automobile, truck, train and the like). The mounting feature 110 may be customized to meet the mounting criteria of a particular application. The uniqueness of the mounting feature 110 may result in a family of base assemblies 102.

Each type of base assembly 102 may have a common set of features to connect with a single type of housing assembly 104, and a unique set of features to account for the different installation criteria.

The tabs 112a-112n may implement snap-on tabs. The tabs 112a-112n may form a ring around the gasket 106. The tabs 112a-112n are generally operational to engage (e.g., snap to) the housing assembly 104. In various embodiments, the snapping (or locking) may not be reversible. In other embodiments, the tabs 112a-11n may be configured to both engage with and disengage from the housing assembly 104 a number of times.

The coupler 114 may implement an optional gas coupler (or fitting). Where implemented, the coupler 114 may provide a surface to connect a hose or pipe containing the gas pressure signal to be measured by the pressure sensor unit 100. In various embodiments, the coupler 114 may be eliminated where the pressure sensor unit 100 is measuring the surrounding environmental pressure.

The housing assembly 104 may include an annular sealing edge 120 and a connector 122. The housing assembly 104 may be formed of the same hard plastic material used to create the base assembly 102. The sealing edge 120 may be configured to form an environmental seal with the gasket 106 while the housing assembly 104 is mated to the base assembly 102. The sealing edge 120 may also be configured to engage with the tabs 112a-112n to hold the housing assembly 104 to the base assembly 102. The connector 122 may be configured to connect to an external electrical connector 90 to convey electrical power and electrical signals.

The housing assembly 104 may support a pressure sensor 124. The pressure sensor 124 may be configured to sense a gas (or pneumatic) pressure signal received through the passage 116 of the base assembly 102 and another passage through the gasket 106. The pressure sensor 124 is generally operational to convert a measured gas pressure into an electrical signal. The pressure sensor 124 may be fabricated as one or more integrated circuits. Electrical power for the pressure sensor 124 may be received through the connectors 90 and 122. Measured data generated by the pressure sensor 124 may be transferred out of the pressure sensor unit 100 through the connectors 122 and 90.

Figure 2:
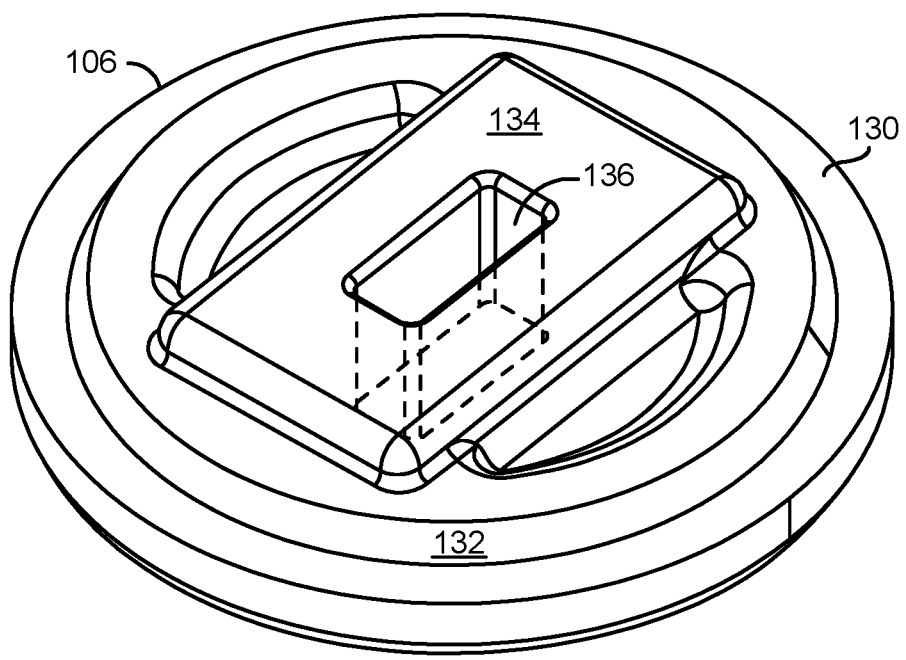
FIG. 2 is a diagram illustrating a gasket of the sensor unit in accordance with an embodiment of the invention.

Referring to FIG. 2, a diagram illustrating an example implementation of the gasket 106 is shown in accordance with an embodiment of the invention. The gasket 106 is generally circular in shape. The gasket 106 generally comprises a compression (or annular) region 130, a sloped (or angled) region 132 and a central (or raised) region 134. A passage (or vent) 136 may extend through the gasket 106, including the central region 134.

The compression region 130 generally extends around an outer perimeter of the gasket 106. The sloped region 132 may extend around the gasket 106 inside the compression region 130. The angled surface of the sloped region 132 may increase a sealing force as a pressure differential rises, thereby making the seal more reliable. The central region 134 may be offset perpendicular to the compression region 130 projected toward the sensor 124. The passage 136 may be aligned at one end with the passage 116 in the base assembly 102. The passage 136 may be aligned at the opposite end with an active side of the pressure sensor 124. In various embodiments, the gasket 106 may be fabricated from a resilient material. The gasket 106 may be fabricated using a two-shot injection molding onto the base assembly 102, fabricated separately and subsequently placed on the base assembly 102, or fabricated by common techniques.

Material for the gasket 106 may include, but is not limited to silicone based material, thermoplastic elastomers (TPE) material and thermoplastic rubber material. Other materials may be implemented to meet the design criteria of a particular application. An overall thickness of the gasket 106 may range from approximately 2 millimeters (mm) to approximately 5 mm.

Figure 3:
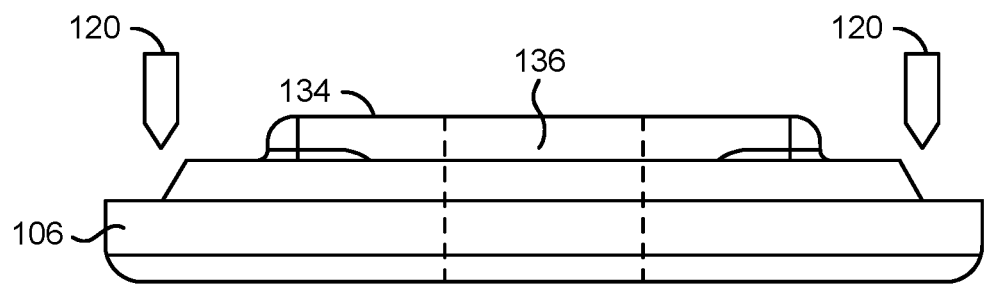
FIG. 3 is a diagram illustrating a side view of the gasket and a sealing edge in accordance with an embodiment of the invention.

Referring to FIG. 3, a diagram illustrating a side view of the gasket 106 and the sealing edge 120 is shown in accordance with an embodiment of the invention. The sealing edge 120 may be aligned with the compression region 130. The sealing edge 120 may extend slightly onto the sloped region 132.

Figure 4:
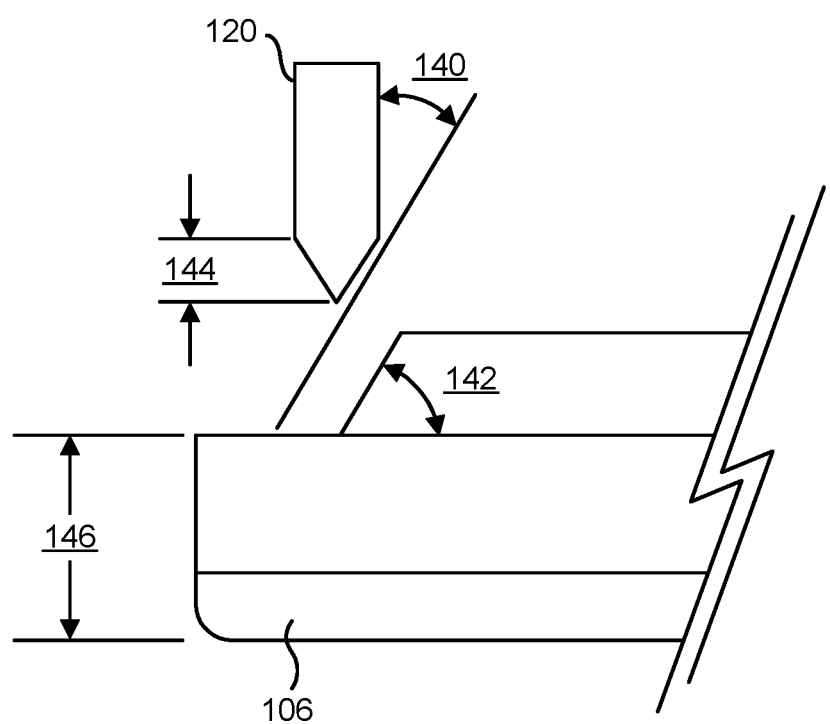
FIG. 4 is a diagram illustrating a closeup side view of the gasket.

Referring to FIG. 4, a diagram illustrating a closeup side view of the gasket 106 and the sealing edge 120 is shown in accordance with an embodiment of the invention. The sealing edge 120 may have a taper. In various embodiments, an angle 140 of the taper may range from approximately 20 degrees to approximately 40 degrees as measured from a side of the sealing edge 120. The taper is generally parallel to the sloped region 132 in the gasket 106. In some embodiments, the sloped region 132 may have an angle 142 ranging from approximately 50 degrees to approximately 70 degrees relative to a radial plane of the circular gasket 106.

In various embodiments, the tapered portion of the sealing edge 120 generally extends a distance 144 that ranges from approximately 1.2 mm to approximately 1.5 mm from a free end. Other taper distances may be implemented to meet the design criteria of a particular application. A thickness 146 of a portion of the gasket 106 aligned to the sealing edge 120 may range from approximately 1.2 mm to approximately 1.8 mm. Other thicknesses of the gasket 106 may be implemented to meet the design criteria of a particular application.

Figure 5:
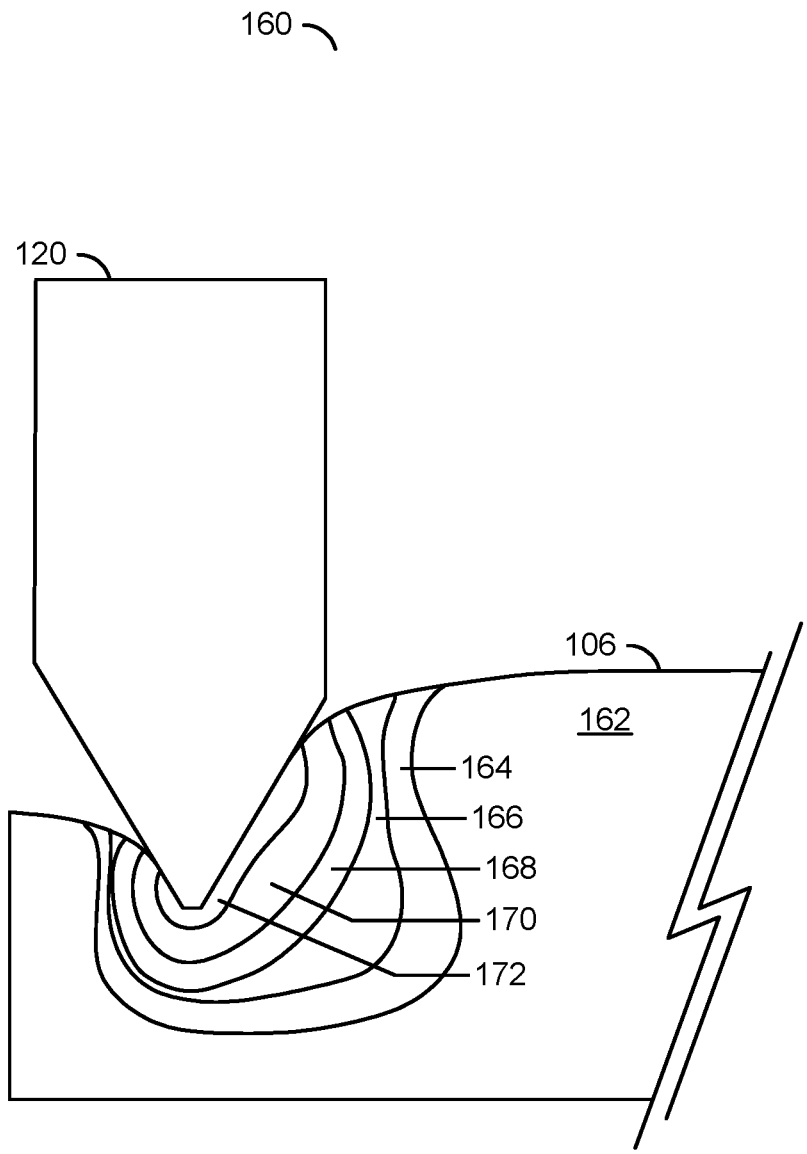
FIG. 5 is a diagram illustrating a two-dimensional simulation of a total deformation in the gasket in accordance with an embodiment of the invention.

Referring to FIG. 5, a diagram illustrating a two-dimensional simulation 160 of a total deformation in the gasket 106 when compressed by the sealing edge 120 is shown in accordance with an embodiment of the invention. The simulations 160, 180 (FIG. 6) and 200 (FIG. 7) may be based on the taper angle 140 of 30 degrees, the slope angle 142 of 60 degrees, the taper length 144 of 1.344 mm, and the gasket thickness 146 of 1.5 mm. The simulated deformation is generally illustrated in units of millimeters (mm).

The deformation in an area 162 generally ranges from zero mm to approximately 0.046 mm. Within an area 164, the deformation may range from approximately 0.046 mm to approximately 0.092 mm. The deformation in the area 166 may range from approximately 0.092 mm to approximately 0.140 mm. In an area 168, the deformation may range from approximately 0.140 mm to approximately 0.186 mm. In an area 170, the deformation may range from approximately 0.186 mm to approximately 0.232 mm. The deformation in the area 172 may be from approximately 0.232 mm to approximately 0.372 mm. Contact between the sealing edge 120 and the gasket 106, as illustrated, generally extends over a greater distance along the sloped region 132 (e.g., to the right of the sealing edge 120) than in the compression region 130 alone (e.g., to the left of the sealing edge 120). The extended contact area generally makes the resulting seal less subject to small voids and/or gaps in the gasket material.

Figure 6:
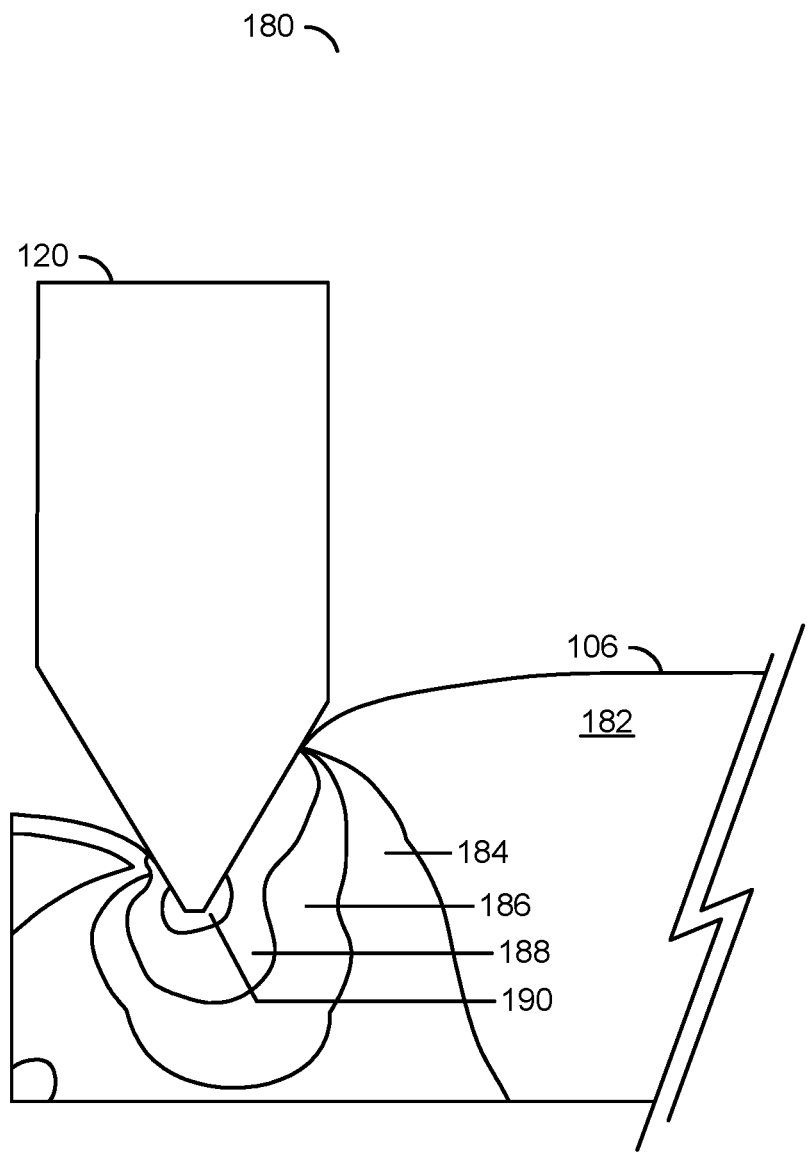
FIG. 6 is a diagram illustrating a two-dimensional simulation of an equivalent elastic strain in the gasket in accordance with an embodiment of the invention.

Referring to FIG. 6, a diagram illustrating a two-dimensional simulation 180 of an equivalent elastic strain in the gasket 106 when compressed by the sealing edge 120 is shown in accordance with an embodiment of the invention. The simulated elastic strain is generally illustrated in units of millimeters per millimeter (mm/mm).

The elastic strain in an area 182 generally ranges from zero mm/mm to approximately 0.113 mm/mm. Within an area 184, the elastic strain may range from approximately 0.113 mm/mm to approximately 0.226 mm/mm. The elastic strain in the area 186 may range from approximately 0.226 mm/mm to approximately 0.339 mm/mm. In an area 188, the elastic strain may range from approximately 0.339 mm/mm to approximately 0.452 mm/mm. In an area 190, the elastic strain may be from approximately 0.452 mm/mm to approximately 0.565 mm/mm. Contact between the sealing edge 120 and the gasket 106, as illustrated, generally extends over a long distance where the strain on the gasket material is less than the strain at the tip of the taper in the sealing edge 120.

Figure 7:
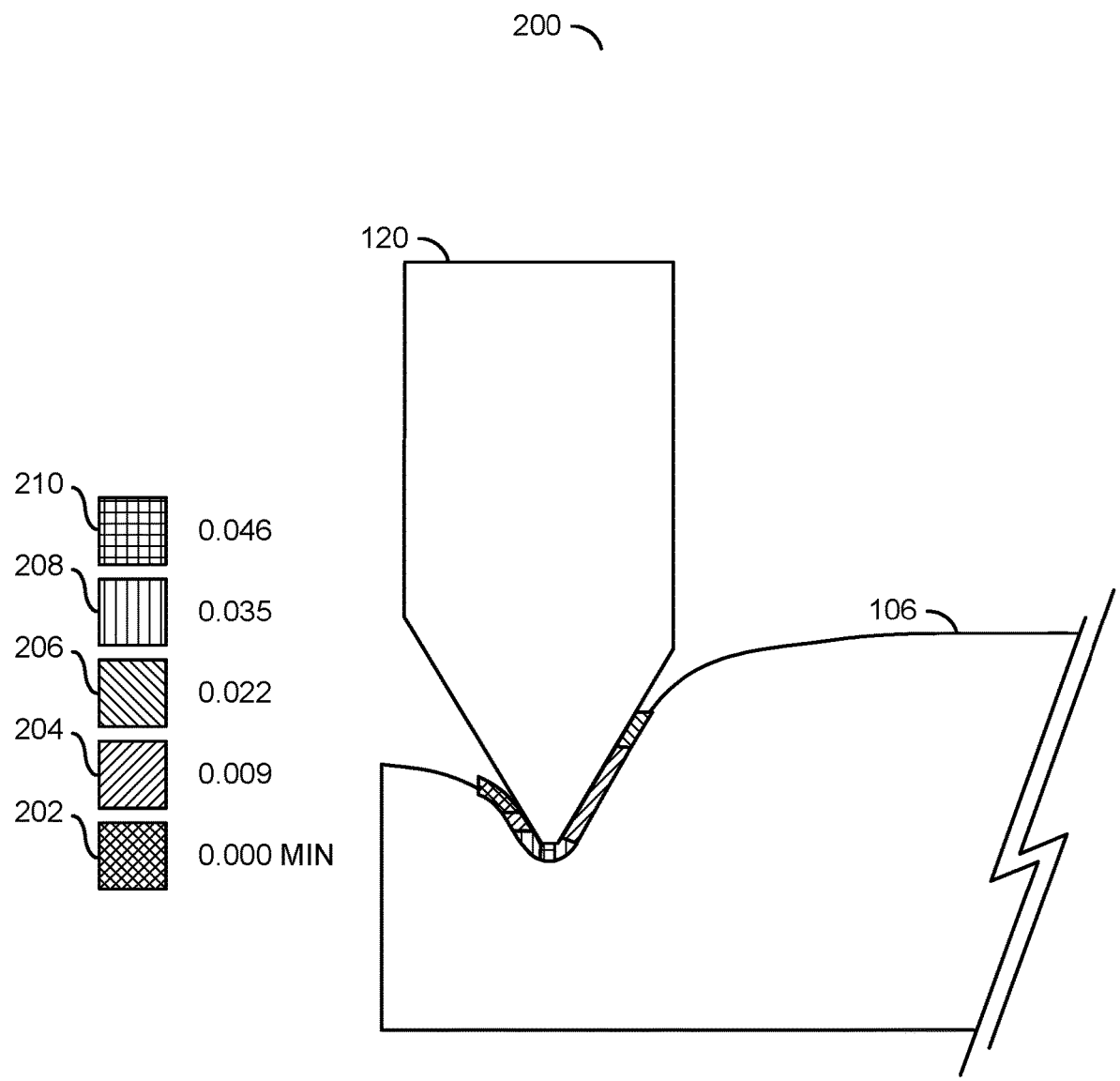
FIG. 7 is a diagram illustrating a two-dimensional simulation of a pressure between the sealing edge and the gasket in accordance with an embodiment of the invention.

Referring to FIG. 7, a diagram illustrating a two-dimensional simulation 200 of a pressure between the sealing edge 120 and the gasket 106 is shown in accordance with an embodiment of the invention. The simulated pressure is generally illustrated in units of megapascals (MPa).

In an area 202, the pressure may range from zero MPa to approximately 0.009 MPa. The pressure may range from approximately 0.009 MPa to approximately 0.022 MPa in the area 204. The pressure may range from approximately 0.022 MPa to approximately 0.035 MPa in the area 206. In the area 208, the pressure may range from approximately 0.035 MPa to approximately 0.043 MPa. Pressures from approximately 0.043 MPa to approximately 0.046 MPa may be illustrated in the area 210. The simulation 200 generally shows a consistent pressure along the sloped region 132. The consistent pressure may be useful in maintaining a seal between the sealing edge 120 and the gasket 106. The pressure is generally above a minimum pressure specified to maintain a seal during a sudden pressure rise event.

Figure 8:
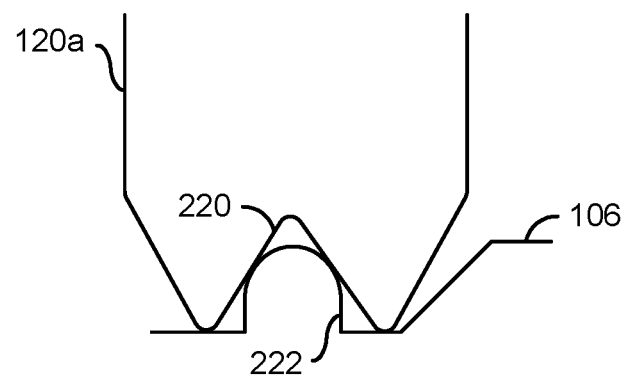
FIG. 8 is a diagram illustrating a design of a sealing edge and ridge in accordance with an embodiment of the invention.

Referring to FIG. 8, a diagram illustrating an example design involving a sealing edge 120a in accordance with an embodiment of the invention. The sealing edge 120a may be a variation of the sealing edge 120. The sealing edge 120a may include a recess (or cavity) 220 at the free end that connects to the gasket 106. The recess 220 may have a triangular cross-section. A ridge (or raised feature) 222 may be included in the compression region 130 of the gasket 106. The ridge 222 may align with the recess 220 while the housing assembly 104 is mated to the base assembly 102. Contact in at least two locations between the recess 220 and the ridge 222 may provide additional sealing surfaces to help maintain the integrity of the overall seal between the sealing edge 120 and the gasket 106.

Figure 9:
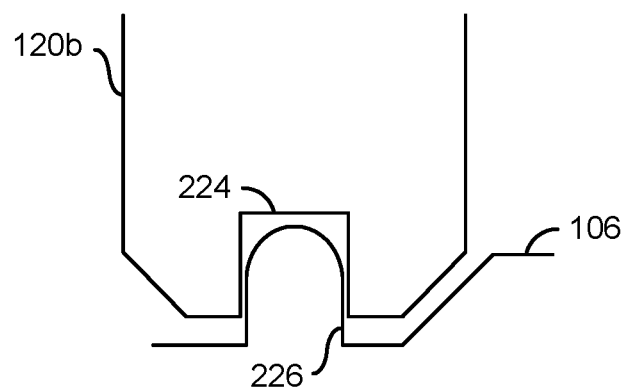
FIG. 9 is a diagram illustrating another sealing edge and ridge in accordance with an embodiment of the invention.

Referring to FIG. 9, a diagram illustrating an example design involving a sealing edge 120b in accordance with an embodiment of the invention. The sealing edge 120b may be a variation of the sealing edges 120 and/or 120a. The sealing edge 120b may include a recess (or cavity) 224 at the free end. The recess 224 may have a rectangular cross-section. A ridge (or raised feature) 226 may be included in the compression region 130 of the gasket 106. The ridge 226 may align with the recess 224 while the housing assembly 104 is mated to the base assembly 102.

The ridge 226 may have a height similar to a depth of the recess 224 and a width slightly less than a width of the recess 224. During assembly, the ridge 226 may contact and compress against a back wall of the recess 224. The back wall may compress the ridge 226. Contacts between the recess 224 and the ridge 226 may provide additional sealing surfaces to help with the overall seal between the sealing edge 120 and the gasket 106.

Figure 10:
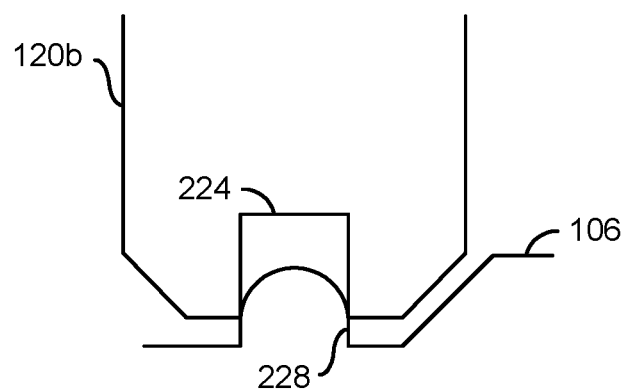
FIG. 10 is a diagram illustrating another ridge in accordance with an embodiment of the invention.

Referring to FIG. 10, a diagram illustrating another example design involving the sealing edge 120b in accordance with an embodiment of the invention. A ridge (or raised feature) 228 may be included in the compression region 130 of the gasket 106. The ridge 228 may align with the recess 224 while the housing assembly 104 is mated to the base assembly 102.

The ridge 228 may have a ball shape with a height smaller that the depth of the recess 224 and a diameter slightly greater than the width of the recess 224. During assembly, the ridge 228 may be forced into the recess 224 and pressed against the inside walls of the recess 224. Contacts between the recess 224 and the ridge 228 may provide additional sealing surfaces to help seal the housing assembly 104 to the base assembly 102.

The structures illustrated in the diagrams of FIGS. 1 to 10 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and maybe executed by one or more of the processors sequentially or in parallel.

Data signals generated by the sensor units (or devices) may be transferred to one or more electronic control units. The electronic control units may utilize the sensor data in one or more transport vehicle functions including, but not limited to, engine control, transmission control, braking control, battery management, steering control, door control, human machine interface, seat control, speed control, restraint systems control, vehicle-to-vehicle communications and diagnostics. The electronic control units may include capabilities to adjust the sensor data to account for calibration issues, environmental factors and aging components.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
  a circular gasket having (i) an annular compression surface around an outer perimeter, (ii) a sloped surface adjoining said annular compression surface and sloping to an intermediate surface, (iii) a rectangular central region extending from said intermediate surface and comprising a sensor sealing surface, and (iv) a passage through said circular gasket and in communication with an exterior of said apparatus; and
  a housing assembly having an annular tapered sealing edge and configured to hold a sensor, wherein (i) said annular tapered sealing edge compresses said circular gasket forming an environmental seal with said annular compression surface and said sloped surface, and (ii) said sensor (a) seals to said sensor sealing surface of said rectangular central region of said circular gasket and (b) is in communication with said exterior of said apparatus through said passage.

2. The apparatus according to claim 1, wherein said sensor comprises a gas pressure sensor.

3. The apparatus according to claim 1, wherein said sensor measures an air pressure inside a motor vehicle.

4. The apparatus according to claim 1, wherein said rectangular central region is offset perpendicular from said intermediate surface and said annular compression surface toward said sensor.

5. The apparatus according to claim 1, wherein said sloped surface is angled between 50 degrees and 70 degrees relative to said annular compression surface.

6. The apparatus according to claim 1, wherein an end of said annular tapered sealing edge has a taper on each side.

7. The apparatus according to claim 6, wherein said taper on an inner side of said annular tapered sealing edge approximately parallels said sloped surface of said circular gasket.

8. The apparatus according to claim 1, wherein said annular tapered sealing edge comprises a notch configured to engage a raised feature of said circular gasket extending from said annular compression surface.

9. The apparatus according to claim 8, wherein a cross-section of said notch is triangular shaped.

10. The apparatus according to claim 8, wherein a cross-section of said notch is rectangular shaped.

11. The apparatus according to claim 8, wherein said raised feature has a length greater than a depth of said notch.

12. The apparatus according to claim 8, wherein said raised feature is wider than said notch.

13. The apparatus according to claim 1, further comprising a base assembly comprising (i) a surface to support said circular gasket and (ii) a mounting feature configured to be attached to a structure.

14. The apparatus according to claim 1, wherein said annular tapered sealing edge imposes a deformation less than or equal to approximately 0.37 millimeters in said circular gasket.

15. The apparatus according to claim 1, wherein said annular tapered sealing edge imposes an elastic strain less than or equal to approximately 0.56 millimeters per millimeter in said circular gasket.

16. The apparatus according to claim 1, wherein said annular tapered sealing edge imposes a pressure less than or equal to approximately 0.043 megapascal on said circular gasket.

17. An apparatus comprising:
a base assembly having (i) a first passage in communication with an exterior of said apparatus and (ii) a mounting feature configured to be attached to a structure;
a circular gasket disposed on said base assembly and having (i) an annular compression surface around an outer perimeter, (ii) a sloped surface adjoining said annular compression surface and sloping to an intermediate surface, (iii) a rectangular central region extending from said intermediate surface and comprising a sensor sealing surface, and (iv) a second passage through said circular gasket and aligned with said first passage; and
a housing assembly having an annular tapered sealing edge and configured to hold a sensor, wherein while said housing assembly is mated to said base assembly (i) said annular tapered sealing edge compresses said circular gasket forming an environmental seal with said annular compression surface and said sloped surface, and (ii) said sensor (a) seals to said sensor sealing surface of said rectangular central region of said circular gasket and (b) is in communication with said exterior of said apparatus through said first passage and said second passage.

18. The apparatus according to claim 17, wherein said sensor comprises a gas pressure sensor configured to measure a pressure inside a motor vehicle.

19. The apparatus according to claim 17, wherein said circular gasket is fabricated onto said base assembly.

20. The apparatus according to claim 17, wherein said circular gasket is fabricated separately and subsequently placed on said base assembly.

* * * * *